US008776376B2

(12) United States Patent
    Williams

(10) Patent No.: US 8,776,376 B2
(45) Date of Patent: Jul. 15, 2014

(54) METHOD OF FORMING PANELED CORNERS

(76) Inventor: Douglas Williams, Northbrook, IL (US)

( * ) Notice: Subject to any disclaimer, the term of this patent is extended or adjusted under 35 U.S.C. 154(b) by 459 days.

(21) Appl. No.: 13/225,540

(22) Filed: Sep. 5, 2011

(65) Prior Publication Data

US 2012/0060349 A1    Mar. 15, 2012

Related U.S. Application Data

(63) Continuation-in-part of application No. 12/109,106, filed on Apr. 24, 2008, now Pat. No. 8,011,849.

(51) Int. Cl.
    *B21K 21/00*   (2006.01)
    *F16B 12/46*   (2006.01)
    *E04F 19/06*   (2006.01)
    *E04F 19/02*   (2006.01)

(52) U.S. Cl.
    CPC ............ *E04F 19/022* (2013.01); *E04F 19/065* (2013.01); *E04F 19/064* (2013.01)
    USPC .............. 29/897.32; 29/450; 29/453; 29/462; 29/525.01; 29/525.11; 403/403; 52/256

(58) Field of Classification Search
    CPC ............ B21D 47/00; E06B 3/72; E06B 3/96; E06B 3/964; E06B 3/9684; B62D 65/06; E04F 19/0459; E04F 19/0463; E04F 19/04; E04F 19/0436; E04F 19/06; E04F 19/064; H02B 1/014; A47B 47/03; A47B 47/042; A47B 47/0033; E04B 2001/1963; E04B 1/38; F16B 12/52; F16B 12/50
    USPC .................. 29/897.32, 462, 450, 453, 525.01, 29/525.11; 403/187, 188, 169, 170, 171, 403/179, 231, 403; 52/256, 276, 287.1; 211/182; 312/140, 265.1, 265.2, 265.3, 312/265.4, 265.5, 265.6
    See application file for complete search history.

(56) References Cited

U.S. PATENT DOCUMENTS

| 2,914,936 | A | 12/1959 | Reinold |
| 3,204,300 | A | 9/1965 | Hoffmann |
| 3,253,842 | A | 5/1966 | Rabe |
| 3,274,624 | A | 9/1966 | Noerdinger |
| 3,304,676 | A | 2/1967 | Sallie et al. |

(Continued)

FOREIGN PATENT DOCUMENTS

| DE | 1112446 | 8/1961 |
| FR | 1176188 | 4/1959 |
| GB | 943668 | 12/1963 |
| SU | 1624218 A1 | 1/1991 |

*Primary Examiner* — Sarang Afzali

(57) ABSTRACT

A method of forming paneled corners including the step of providing first and second components. The first components can each have a pair of first legs forming an exterior angle of greater than 180 degrees, and can have a first connector. The second components can each have a pair of second legs forming an interior angle of less than 180, and can have a second connector. The method can further include the steps of choosing an outside corner from an outside corner and an inside corner, selecting one of the first components, placing the one first component over the outside corner, securing the one first component, placing panels on the first legs, selecting one of the second components, pushing the one second component onto the one first selected component to engage their respective second and first connectors, thereby capturing the edges of the two panels.

18 Claims, 13 Drawing Sheets

(56) References Cited

U.S. PATENT DOCUMENTS

| | | | |
|---|---|---|---|
| 3,557,413 A | 1/1971 | Engle | |
| 3,667,177 A * | 6/1972 | Biela | 52/278 |
| 4,027,452 A | 6/1977 | Donnell | |
| 4,067,155 A | 1/1978 | Ruff et al. | |
| 4,114,247 A * | 9/1978 | Toti | 29/453 |
| 4,325,044 A | 4/1982 | Ehrgott et al. | |
| 4,385,850 A * | 5/1983 | Bobath | 403/205 |
| 4,429,438 A | 2/1984 | Takeshima et al. | |
| 4,477,201 A | 10/1984 | Yoshiyuji | |
| 4,555,255 A | 11/1985 | Kissel | |
| 4,689,930 A | 9/1987 | Menchetti | |
| 4,691,373 A | 9/1987 | Ausnit | |
| 4,731,911 A | 3/1988 | Gould | |
| 5,065,559 A | 11/1991 | Zegel et al. | |
| 5,114,265 A | 5/1992 | Grisley | |
| 5,149,108 A | 9/1992 | Leiszter | |
| 5,351,369 A | 10/1994 | Swain | |
| 5,357,728 A | 10/1994 | Duncanson | |
| 5,588,187 A | 12/1996 | Swain | |
| 5,611,185 A | 3/1997 | Wilz | |
| 5,614,232 A | 3/1997 | Torigoe et al. | |
| 5,644,878 A | 7/1997 | Wehrmann | |
| 5,676,486 A | 10/1997 | Keith | |
| 5,699,601 A | 12/1997 | Gilliam et al. | |
| 5,791,810 A | 8/1998 | Williams | |
| 6,094,879 A | 8/2000 | Dickeduisberg | |
| 6,146,048 A | 11/2000 | Stibolt | |
| 6,205,732 B1 | 3/2001 | Rebman | |
| 6,209,275 B1 | 4/2001 | Cates et al. | |
| 6,217,251 B1 | 4/2001 | Kato et al. | |
| 6,647,679 B2 | 11/2003 | Belleau | |
| 2006/0070329 A1 * | 4/2006 | Schiltz | 52/506.01 |

* cited by examiner

METHOD OF FORMING PANELED CORNERS

RELATED APPLICATION DATA

This patent is a continuation-in-part of, and claims priority benefit of, U.S. patent application Ser. No. 12/109,106, filed on Apr. 24, 2008, to be issued as U.S. Pat. No. 8,011,849. The entire disclosure of the prior application is hereby incorporated by reference in its entirety.

BACKGROUND

1. Field of the Disclosure

The present disclosure is generally directed to paneled corners on ceilings and walls, and more particularly to a method of paneling corners using versatile corner connectors.

2. Description of Related Art

A number of devices and systems are known in the art that mount and support suspended or dropped ceiling panels, ceiling tiles, acoustical tiles, wall panels, or the like. These devices generally are configured having distinctive features that are specific to a particular panel structure or application. Once installed, most known devices and systems are difficult to disassemble or make it difficult to remove and replace individual panels. Some prior art devices have parts that fasten to each other and/or to other components to support a panel. This can make it difficult or impossible to disassemble, uninstall, and reuse the parts.

Often, walls or ceilings have obstructions that are displaced from the plane of the surface. These often include water pipes, steam pipes, electrical conduit, air ducts, and the like. Known panel mounting systems and devices are not configured to accommodate such structures and obstacles. The obstructions are typically enclosed using non-removable materials such as sheetrock, panel-board or plywood. Sometimes, permanent grid systems can be cut, shaped, and riveted or fastened in place in a manner to mount panels that enclose the obstruction. However, the systems and components are difficult to install in such a manner, and make it time consuming to do so.

In some cases, the fastening mechanisms employ a male and a female section or compatible sections that connect to one another without the use of fasteners. Typical prior known devices of this type are designed to suspend or mount ceiling or wall panels within in a single plane such as on a flat ceiling or a flat wall.

U.S. Pat. No. 5,791,810 (Williams) discloses a detachable panel support device for two-dimensional or flat, single plane applications. In particular, the Williams connector has a first connector section and a second connector section, each with extending elements protruding from the section. The extending elements of the two sections join together or interlock with one another and create spaces between the joined sections to capture panels. The Williams connecting device can form a reusable and continuous joint along each pair of mated sections to support panels. However, the Williams device is applicable to flat or two-dimensional walls or ceilings. U.S. Pat. No. 6,205,732 B1 (Rebman) describes a grid system for mounting and supporting ceiling tiles in a two-dimensional suspended or dropped ceiling. The parts of the grid system snap together with male and female components.

Other connecting devices in the prior art are known that can accommodate a specific corner application to connect adjacent panels at a corner. For example, U.S. Pat. No. 5,676,486 (Keith) discloses a one-piece corner connector configured to join panels at an interior corner, i.e., a 90° corner. The Keith device is formed as a one piece structure configured to join side edges of two rectangular panels that meet in a corner and is sized for panels of a specific thickness.

U.S. Pat. No. 5,065,559 (Zegel et al.) discloses a two-dimensional wall system with locking connectors and vertical supports. Panels are mounted via fasteners to the supports. The corner pieces of the Zegel et al. system are internal to the corner and the panels fasten to an exterior surface of the pieces.

Other prior art connectors attempt to solve the problem of economically joining panel supports at corners and yet maintaining an esthetically pleasing look. U.S. Pat. No. 6,094,879 (Dickeduisberg) describes a resilient corner configured to join two adjacent L-shaped channels end to end at an angle. The connectors are separate from the channels. U.S. Pat. No. 4,027,452 (Donnell) discloses an interior molding to join wall paneling at an interior corner. The molding is a single unitary device secured to the walls in the corner and is sized to accept a specific panel thickness.

U.S. Pat. No. 6,209,275 B1 (Cates et al.) discloses a wall system. Cates has corner pieces that are configured to mate with panels specific to the system. The Cates device requires numerous components and would be complex to install and assemble. U.S. Pat. No. 4,555,255 (Kissel) describes an invertible corner-connecting clip which fits a right or left-hand corner.

Additional interlocking connecting structures are also known in the art to included projecting and interlocking elements. U.S. Pat. No. 6,217,251 B1 (Kato et al.) describes a joining device for connecting to elements end to end. An additional third hollow joint attaches over the joined ends to retain the connection. U.S. Pat. No. 5,614,232 (Torigoe et al.) discloses an apparatus for producing a fastener with interlocking projections.

SUMMARY OF THE DISCLOSURE

In one example according to the invention, a method of forming paneled corners can include the step of providing first and second components. The first components can each have a pair of first legs oriented relative to one another at an angle forming an exterior angle of greater than 180 degrees and joined along a lengthwise seam, and can have a first connector protruding from adjacent the seam along the length and on the exterior side of the first component and equally dividing the exterior angle. The second components can each have a pair of second legs oriented relative to one another at the same angle and forming an interior angle of less than 180 degrees and joined along a lengthwise seam, and can have a second connector protruding from adjacent the seam along the length and on the interior side of the second component and equally dividing the interior angle. The method can further include the steps of choosing an outside corner of a structure to panel from an outside corner and an inside corner to be paneled, selecting one of the first components, placing the one first component over the outside corner, securing the one first component to the outside corner, placing panels adjacent the structure with a panel edge of each on a respective one of the first legs, selecting one of the second components, and pushing the one second component onto the one first selected component to engage their respective second and first connectors, thereby capturing the edges of the two panels between the corresponding first and second legs.

In one example according to the invention, the method can further include the steps of choosing the inside corner of the structure, selecting another of the second components, placing the another second component over the inside corner, securing the another second component to the inside corner, placing panels adjacent the structure with a panel edge of each on a respective one of the second legs, selecting another of the first components, and pushing the another first connector onto the another second selected component to engage their respective first and second connectors, thereby capturing the edges of the two panels between the second and first legs.

In one example according to the invention, the step of providing can further include providing the first components each with a spaced apart pair of first connector flanges as the first connectors, and providing the second components each with a second connector flange as the second connectors that can interferingly fit between any pair of the first connector flanges when engaged.

In one example according to the invention, the step of providing can further include providing each of the first and second connector flanges with a stem section and a head extending along a free edge of the stem section. Each head can have a thickness that is greater than a thickness of the corresponding stem section. The spacing between each pair of the first connector flanges can match the head thickness of each of the second connector flanges.

In one example according to the invention, the step of connecting can further include pushing the head of the second connector flange between a pair of the first connector flanges.

In one example according to the invention, the step of securing can further include installing fasteners through a first and second fastener groove along a lengthwise surface of each of the first and second legs on the same side as the respective first and second connectors.

In one example according to the invention, the method can further include the step of selectively removing the one second component from the one first component by pulling the engaged first and second connectors apart from one end to the other of the first and second components thereby releasing the panels.

In one example according to the invention, the step of providing further includes providing the first and second components as extruded PVC components.

In one example according to the invention, a method of forming paneled corners can include the steps of providing first and second components. The first components can each have a pair of first legs oriented relative to one another at an angle forming an exterior angle of greater than 180 degrees and joined along a lengthwise seam, and can have a first connector protruding from adjacent the seam along the length and on the exterior side of the first component and equally dividing the exterior angle. The second components can each have a pair of second legs oriented relative to one another at the same angle and forming an interior angle of less than 180 degrees and joined along a lengthwise seam, and can have a second connector protruding from adjacent the seam along the length and on the interior side of the second component and equally dividing the interior angle. The method can further include the steps of selecting one of the first components, fastening the one first component over an outside corner of a structure, placing panels adjacent the structure with a panel edge of each over a respective one of the first legs, selecting one of the second components, pushing the one second component onto the one first component which engages their respective second and first connectors and captures the edges of the two panels between the first and second legs of the respective first and second components, fastening another of the second connector components, fastening the another second component over an inside corner of a structure, placing panels adjacent the structure with a panel edge of each over a respective one of the second legs, selecting another of the first components, and pushing the another first component onto the another second component to engage their respective first and second connectors, thereby capturing the edges of the two panels between the respective second and first legs.

In one example according to the invention, the step of providing can further include providing the first components each with a spaced apart pair of first connector flanges as the first connectors, and providing the second components each with a second connector flange as the second connectors that can interferingly fit between any pair of the first connector flanges when engaged.

In one example according to the invention, the step of providing can further include providing each of the first and second connector flanges with a stem section and a head extending along a free edge of the stem section. Each head can have a thickness that is greater than a thickness of the corresponding stem section. The spacing between each pair of the first connector flanges can match the head thickness of each of the second connector flanges of the second connectors.

In one example according to the invention, the steps of fastening can further include installing fasteners through a first and second fastener groove along a lengthwise surface of each of the first and second legs on the same side as the connectors and into a substrate of the structure.

In one example according to the invention, the method can further include the steps of providing a kit having a plurality of first and second components. The first components can each have a pair of first legs oriented relative to one another at an angle forming an exterior angle of greater than 180 degrees and joined along a lengthwise seam. The first components can also have a first connector protruding from adjacent the seam along the length and on the exterior side of the first component and equally dividing the exterior angle. The second components can each have a pair of second legs oriented relative to one another at the same angle and forming an interior angle of less than 180 degrees and joined along a lengthwise seam. The second component can also have a second connector protruding from adjacent the seam along the length and the interior side of the second component and equally dividing the interior angle. The method can further include the steps of selecting one of the first components, securing the one first component over an outside corner of a structure with the respective first connector exposed, placing panel edges over the legs of the one first component, engaging the second connector of one of the second components to the exposed first connector capturing the edges of the panels therebetween, selecting another of the second components, securing the another second component over an inside corner of a structure with the second connector exposed, placing panel edges over the legs of the another second component, and engaging the first connector of another one of the first components to the exposed second connector capturing the edges of the panels therebetween.

In one example according to the invention, the method can further include the step of disconnecting the one second component from the one first component of the outside corner by lengthwise pulling apart the second connector from the first connector.

In one example according to the invention, the method can further include the steps of removing the one first component from the outside corner, securing the one second component to an inside corner of a structure with the second connector exposed placing panel edges over the legs of the one second component, and engaging the first connector of the one first component to the exposed second connector of the one second component capturing the panel edges therebetween.

In one example according to the invention, the method can further include the step of disconnecting the another first component from the another second component of the inside corner by lengthwise pulling apart the first connector from the second connector.

In one example according to the invention, the method can further include the step of, removing the another second component from the outside corner, mounting the another first component to an outside corner of a structure with the first connector exposed, placing panel edges over the legs of the another first component, and engaging the second connector of the another second component to the exposed first connector of the another first component capturing the panel edges therebetween.

In one example according to the invention, the method can further include the step of trimming one or more of the first and second corner components to a desired length.

In one example according to the invention, the steps of fastening can further include installing fasteners through a fastener groove extending lengthwise along each of the pair of first and second legs.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

The disclosed corner connector devices and method of using the disclosed corner connectors or kit represent an advance over prior art devices. The devices provide a corner connector to join and support panels at corners between two room walls, between a ceiling and a wall, or between other non-coplanar surfaces. The disclose devices employ two connector components or strips that can be connected to one another without the need for additional fasteners or separate parts, other than the two connector strips. Also, the disclosed devices can be assembled and installed in a manner that can accommodate both an interior or inside corner and an exterior or outside corner where two non-coplanar surfaces meet at a corner. In addition to being capable of more than one installation orientation, the disclosed devices have a simple, straightforward design, are easy to assemble and install, and are relatively simple and economical to manufacture. The disclosed devices solve a long-felt need for a system that can easily and readily join panels at corners. The disclosed devices also solve a long-felt need for a system that can be configured to enclose beams, pipes, ducts, columns, and similar structures, obstructions, and the like. Wall and ceiling panels and tiles, once mounted using the disclosed devices, are easy to remove, reinstall, replace, swap, and the like. One of the two connector strips can easily be removed from the other to release a panel captured between the two connectors.

Figure 1:
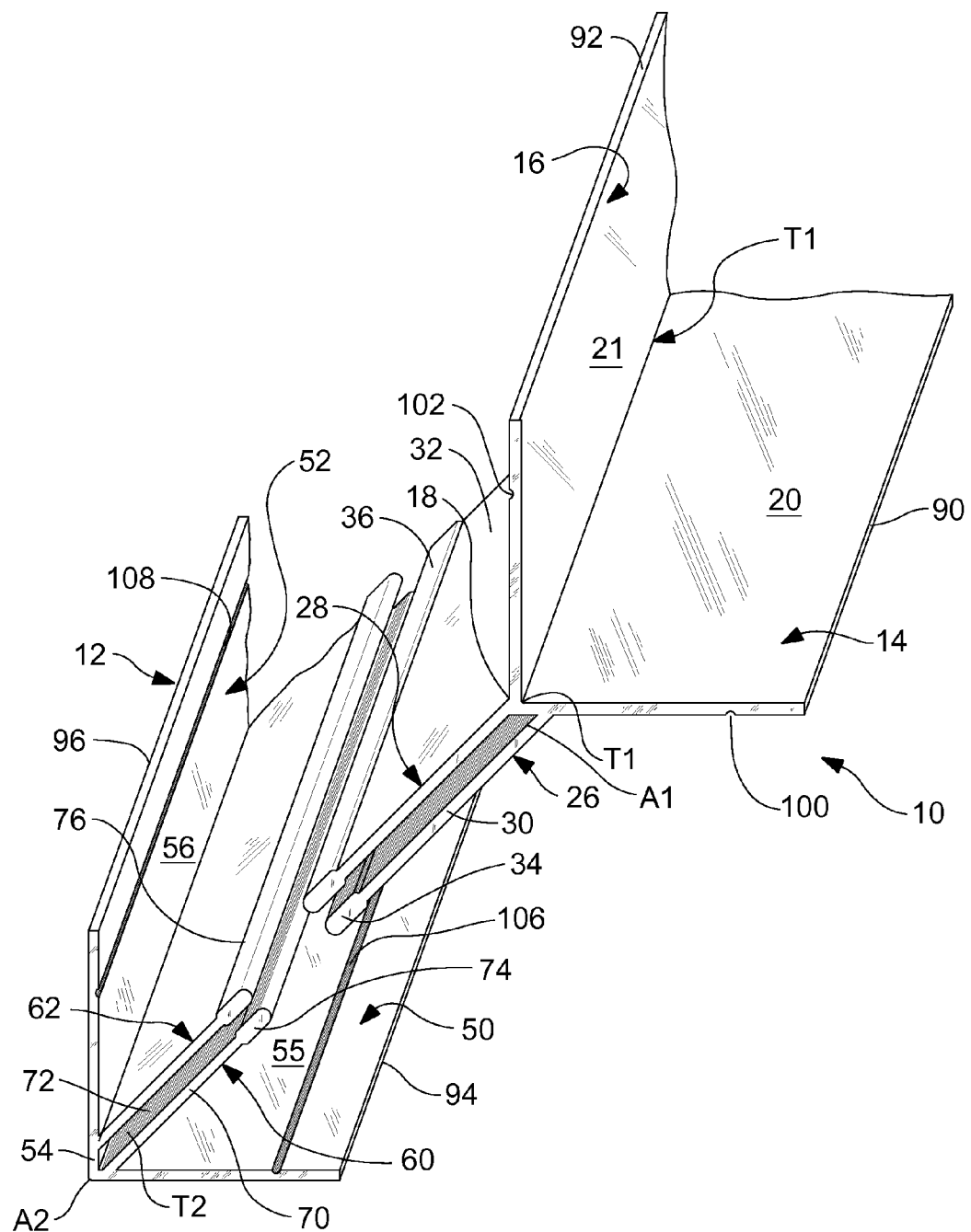
FIG. 1 shows a perspective, lengthwise fragmentary view of one example of a corner connector device according to the teachings of the present invention with the two connector strips disconnected.
Figure 2:
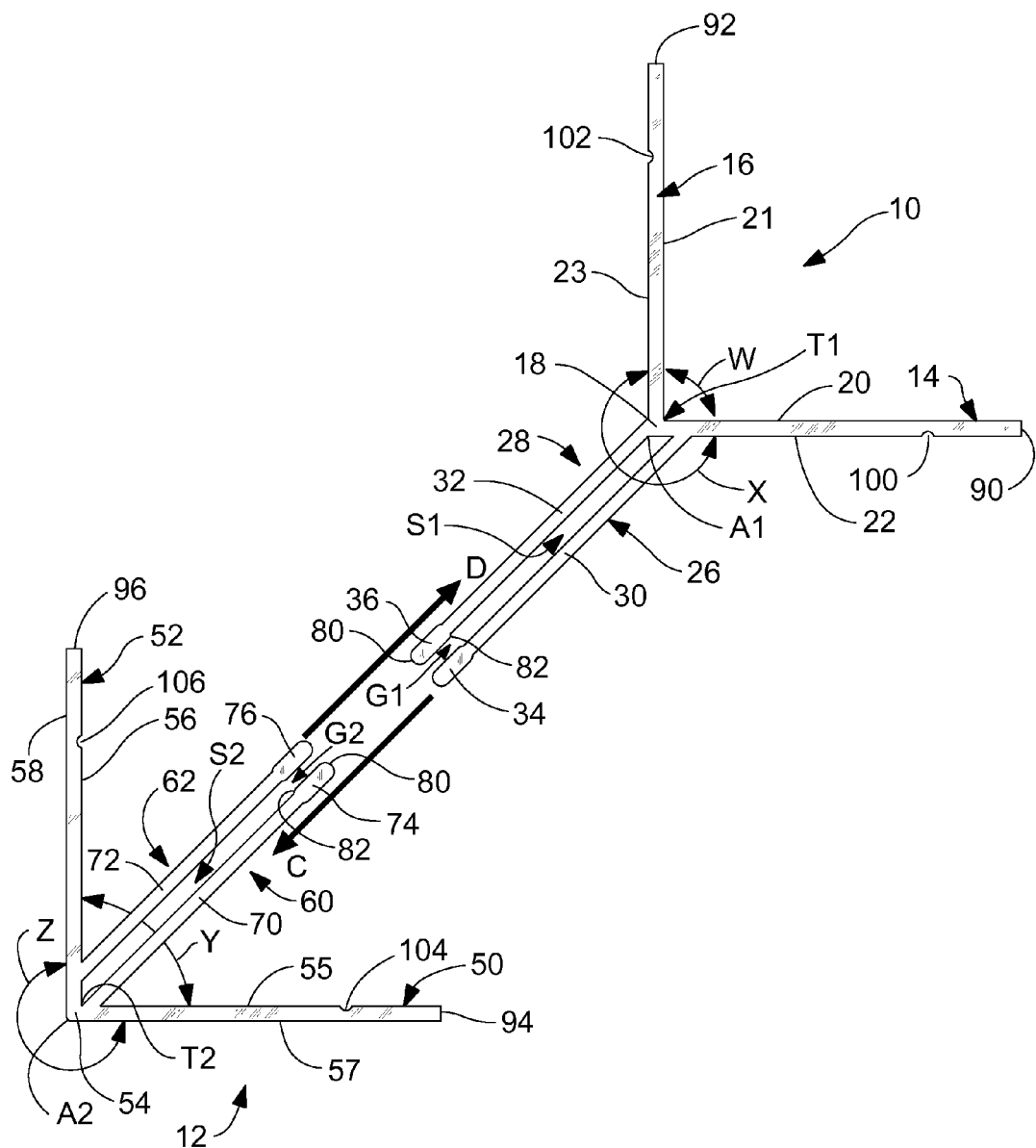
FIG. 2 shows an end view of the disconnected device in FIG. 1.

Turning now to the drawings, FIGS. 1 and 2 illustrate one example of a corner connector device in accordance with the teachings of the present invention. In this example, the device is disclosed for use on or in corners that have surfaces meeting at right angles. In this example, the connector device has two elongate connector components or strips 10 and 12 that can be cut or trimmed to a desired length. The two strips 10 and 12 can also removably connect to one another and each strip can be mounted to a surface or supporting structure, depending on the application.

The first connector strip or component 10 in FIGS. 1 and 2 is configured to fit over an outside corner and hereinafter is called an outside connector strip or component. The outside connector strip or component 10 is essentially an elongate generally L- or V-shaped channel when viewed in cross section or on end. The channel is defined by a first leg 14 and a second leg 16 that are joined or connected to one another at a joint or seam 18. In this example, a valley or trough T1 of the seam 18 is created at the juncture between inner facing surfaces 20 and 21 of the respective first and second legs 14 and 16. Similarly, a peak or apex A1 of the seam 18 is created at the juncture between outer facing surfaces 22 and 23 of the respective first and second legs 14 and 16.

As noted above, the legs 14 and 16 can be oriented at a 90° or right angle relative to one another. In this example, the 90° angle W is created between the inner facing surfaces 20 and 21 of the legs 14 and 16. As a result, a 270° exterior angle X is created between the outer facing surfaces 22 and 23 of the legs 14 and 16 in this example. Depending on the particular application, it is within the scope and spirit of the invention for the channel angle of the outside connector strip 10 to be greater than or less than 90°, if desired. In any event, the inner facing surfaces will define an interior angle W less than 180° and the outer facing surfaces will define an angle X greater than 180°. Outside connector strips having other angles can be manufactured for panel installations requiring specific needs, such as joining wall and ceiling panels where the room walls meet a vaulted ceiling. However, as is known in the construction and architectural fields, a majority of wall and ceiling structures are formed with right angle surfaces between wall, ceiling, and/or obstruction surfaces.

Also as shown in FIGS. 1 and 2, the outside connector strip 10 has an outside connector that projects from part of the channel to connect to the other strip 12. In this example, the outside connector includes a plurality of connector flanges that are spaced apart from one another. In this example, the plurality of flanges includes a first outside connector flange 26 and a second outside connector flange 28. As will become evident to those of ordinary skill in the art upon reading this disclosure, more than two outside projecting elements or flanges can be used within the teachings of the present invention. However, in the disclosed example a minimum of two of the connector flanges 26 and 28 is provided in order to connect the strip 10 with the strip 12 as described below. Also, the positioning of the outside flanges may vary from the positions as shown.

Each outside connector flange 26 and 28 has a respective first stem section 30 and second stem section 32 that is attached to the channel. In this example, the stem section 30 of the flange 26 extends from the outside surface 22 of the first leg 14 and is offset a distance from the apex A1 along the surface. The stem section 32 of the flange 28 extends from the outside surface 23 of the second leg 16 very near, but slightly offset from, the apex A1. Each connector flange 26 and 28 is somewhat paddle-shaped and has a respective bead or head section 34 and 36 on the free edge of the corresponding stem 30 and 32. The heads 34 and 36 have a greater thickness than the stems 30 and 32. Thus, a gap G1 between the adjacent heads 34 and 36 is smaller than a spacing or distance S1 between the adjacent stems 30 and 32.

In this example, the connector flanges 26 and 28 are oriented parallel with one another and are oriented at 135° obtuse angles relative to their adjacent legs surface 22 and 23. Thus, the flanges essentially bisect or equally divide the 270° angle X between the outer facing surfaces 22 and 23 in this example. As needed, the flange angles can also change, if the channel/leg angle is changed to accommodate a particular non-right angle installation application. Additionally, the flanges need not be oriented to bisect the obtuse angle as shown. Also as represented in FIG. 1, the first and second outside connector flanges 26 and 28 extend continuously lengthwise along the channel, as do the first and second legs 14 and 16. The length of the flanges 26 and 28 can be trimmed as the outside connector strip 10 is trimmed to a desired length during installation.

The second corner connector strip or component 12 in FIGS. 1 and 2 is configured to fit within and inside corner and hereinafter is called an inside connector strip or component. The inside connector strip 12 is also essentially an elongate channel that is generally L- or V-shaped when viewed in cross section or on end. The channel is defined by a third leg 50 and a fourth leg 52 that are joined or connected to one another at a joint or seam 54. In this example, a valley or trough T2 of the seam 54 is created at the juncture between inner facing surfaces 55 and 56 of the respective third and fourth legs 50 and 52. Similarly, a peak or apex A2 of the seam 54 is created at the juncture between outer facing surfaces 57 and 58 of the respective third and fourth legs 50 and 52.

As with the strip 10, the legs 50 and 52 can be oriented at a 90° or right angle relative to one another. In this example, the interior 90° angle Y is created between the inner facing surfaces 55 and 56 of the legs 50 and 52. As a result, an exterior 270° angle Z is created between the outer facing surfaces 57 and 58 of the legs 50 and 52 in this example. Depending on the particular application, it is within the scope and spirit of the invention for the channel angle of the inside connector strip 12 to be greater than or less than 90°, if desired. In any event, the inner facing surfaces will define an acute angle Y less than 180° and the outer facing surfaces will define an angle Z greater than 180°. Inside connector strips having other angles can be manufactured for panel installations requiring specific needs, such as joining wall and ceiling panels where the room walls meet a vaulted ceiling, as noted above.

As further shown in FIGS. 1 and 2, the inside connector strip 12 has an inside connector that projects from part of the channel to connect to the other strip 10. In this example, the inside connector includes a plurality of inside connector flanges that project from part of the channel and that are spaced apart from one another. In this example, the plurality of flanges includes a third inside connector flange 60 and a fourth inside connector flange 62. As will become evident to those of ordinary skill in the art upon reading this disclosure, more than two inside projecting elements or flanges can be used within the teachings of the present invention. However, in the disclosed example a minimum of two of the inside connector flanges 60 and 62 are provided in order to connect the strip 12 with the strip 10 as described below. In one alternative example, one of the two connector strips 10, 12 could be provided with only a single flange that connects with a pair of the flanges on the other strip. Also, the positioning of the flanges on the strip 12 may vary from the positions as shown.

Each inside connector flange 60 and 62 has a respective third stem section 70 and fourth stem section 72 that is attached to the channel. In this example, the stem section 70 of the flange 60 extends from the inside surface 55 of the third leg 50 very near, but slightly offset from, the apex A2. The stem section 72 of the flange 62 extends from the inside surface 56 of the fourth leg 52 and is offset a distance from the apex A2 along the surface. Each connector flange 60 and 62 is also somewhat paddle-shaped and has a respective bead or head section 74 and 76 on the free edge of the corresponding stem 70 and 72. The heads 74 and 76 have a greater thickness than the stems 70 and 72. Thus, a gap G2 between the adjacent heads 74 and 76 is smaller than a spacing or distance S2 between the adjacent stems 70 and 72.

As discussed in greater detail below, the sizes, shapes, spacing, and gap of the first and second outside flanges 26 and 28 match the sizes, shapes, spacing, and gap of the third and fourth flanges 60 and 62. In this example, the connector flanges 60 and 62 are also oriented parallel with one another. However, the inside connector flanges 60 and 62 are oriented at 45° acute angles relative to their adjacent legs surface 55 and 56. Thus, the flanges essentially bisect or equally divide the acute 45° interior angle between the outer facing surfaces 55 and 56 in this example. As with the strip 10, the flange angles can also change, if the channel/leg angle of the inside connector strip 12 is changed to accommodate a particular non-right angle installation application. Also, the flanges need not be oriented to bisect the acute angle as shown. The third and fourth inside connector flanges 60 and 62 also extend continuously lengthwise along the channel, as do the third and fourth legs 50 and 52. The length of the flanges 60 and 62 can be trimmed as the inside connector strip 12 is trimmed to a desired length during installation.

As shown in FIG. 2, the connector strips 10 and 12 can be connected to one another by pushing the inside connector flanges 26, 28 toward the outside connector flanges 60 and 62 together in the direction of Arrow C. Similarly, the strips 10 and 12 can be disconnected from one another by pulling their respective flanges apart in the direction of the Arrow D. To facilitate connection in the Arrow C direction, each bead or head 34, 36, 74, 76 has a rounded end or tip 80. To facilitate disconnection in the Arrow D direction, each bead or head 34, 36, 74, 76 has ramps 82 that provide angled transition surfaces between the thicker heads and the respective thinner stem sections 30, 32, 70, 72 as discussed further below. The flanges 26, 28, 60, 62 are resiliently flexible such that each pair can be moved or displaced apart.

Figure 3:
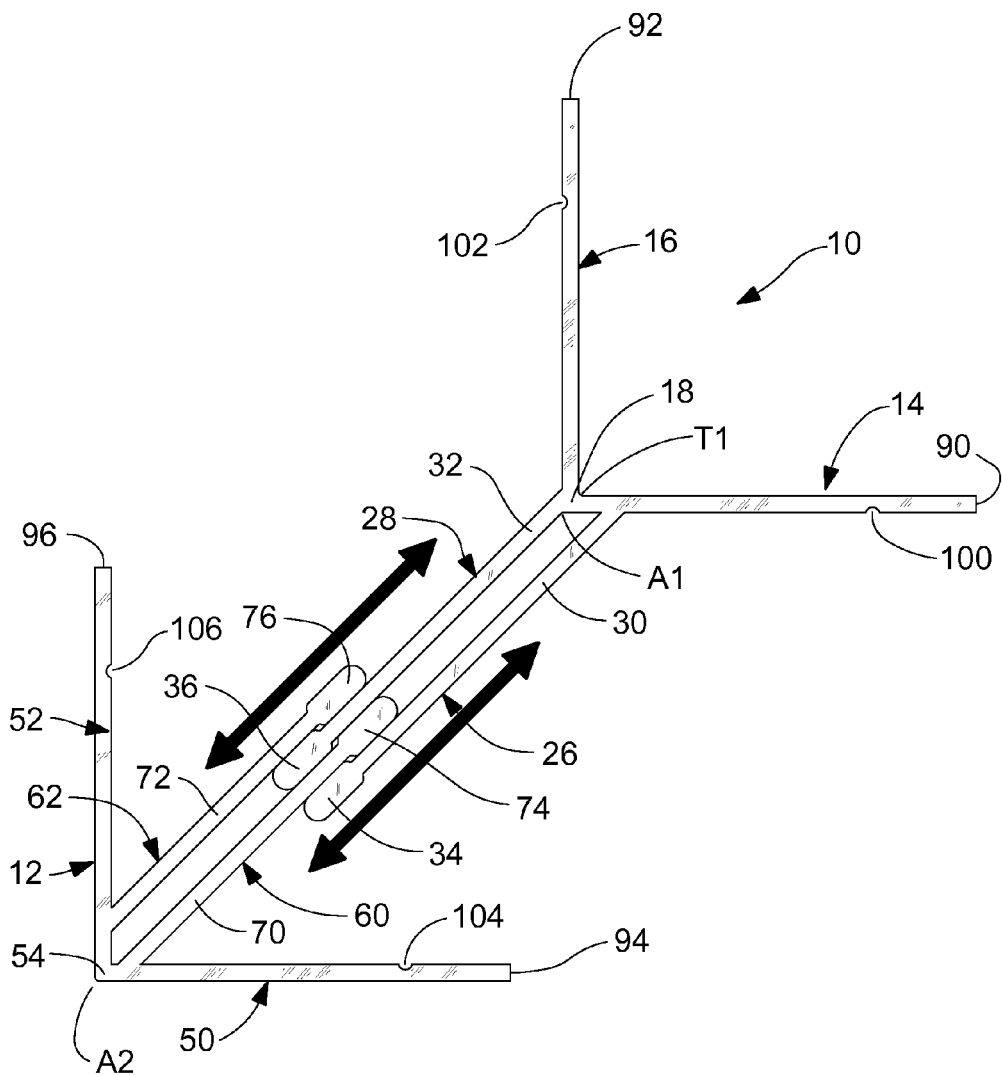
FIG. 3 shows the device of FIG. 2 in an assembled condition with the two connector strips connected to one another and expanded to a maximum panel space condition.

Referring now to FIG. 3, the inside and outside connector strips 10, 12 are shown connected to one another. In this example, the positioning of the connector flanges 26 and 28 relative to the apex A1 on the outside strip 10 is offset in the opposite direction to the positioning of the connector flanges 60 and 62 relative to the apex A2 on the inside connector strip 12. This offset differential aligns or centers the two connector strips 10, 12 relative to one another when connected. In the disclosed example, the head or bead 36 of the outside connector flange 28 is positioned between the heads 74, 76 of the inside connector flanges 60, 62. The head or bead 74 of the inside connector flange 60 is likewise positioned between the heads 34, 36 of the outside connector flanges 26, 28. As the two strips 10, 12 are pushed together, the rounded tips 80 of the heads 36 and 74 push between the flanges 60, 62 and 26, 28, respectively, to pass through the gaps G2 and G1 as shown in FIG. 2. The heads 36 and 74 will then seat in the spaces S2, S1 between the opposing pair of flanges after passing beyond the corresponding heads.

In this example, the spaces S1 and S2 are sized to essentially match the thickness of the heads. The head and space size, along with the resiliency of the flanges 26, 28, 60, and 62, allows the flanges to return to their essentially parallel orientations once the strips 10 and 12 are connected. In FIG. 3, the two connector strips 10 and 12 are depicted in a position just after the heads 76 and 34 have seated in the flange spaces S1 and S2. This position defines a maximum panel thickness position for the connector device. If the two strips 10 and 12 are pulled apart beyond this maximum position, the heads 34 and 76 will return through the gaps G2, G1 and the strips will separate. Once in the maximum position, the two strips 10 and 12 can also be pushed further together until one of the heads bottoms out against the opposite strip. This bottomed out position defines a minimum panel thickness position for the connector device.

In this example, the head 34 of flange 26 bottoms out when in a minimum position. Nonetheless, the length of the flanges could vary, and, if of sufficient length, one or the other of flanges 60, 62 could bottom out. Furthermore, the two connector strips 10, 12 could be connected in a non-align position, wherein, for example, the head 34 of flange 26 could be seated between flanges 60, 62, provided that the legs are of sufficient length to capture and support a panel.

In this example, the corner connector device including the connector strips 10 and 12 are intended for installation of panels such as ceiling panels or tiles, wall panels, and the like. The spacing between the connector strips 10 and 12 so that they can be positioned relative to one another anywhere between the maximum and minimum panel thickness positions. This can be done to accommodate different sized panels. Also, in many situations it may be impracticable to have two tightly connected strips. Many building structures and building materials, including ceiling tiles and wall and ceiling panels, have dimensional irregularities. The positional adjustment capability between the connector strips 10 and 12 of the disclosed connector device can accommodate such irregularities.

Figure 4:
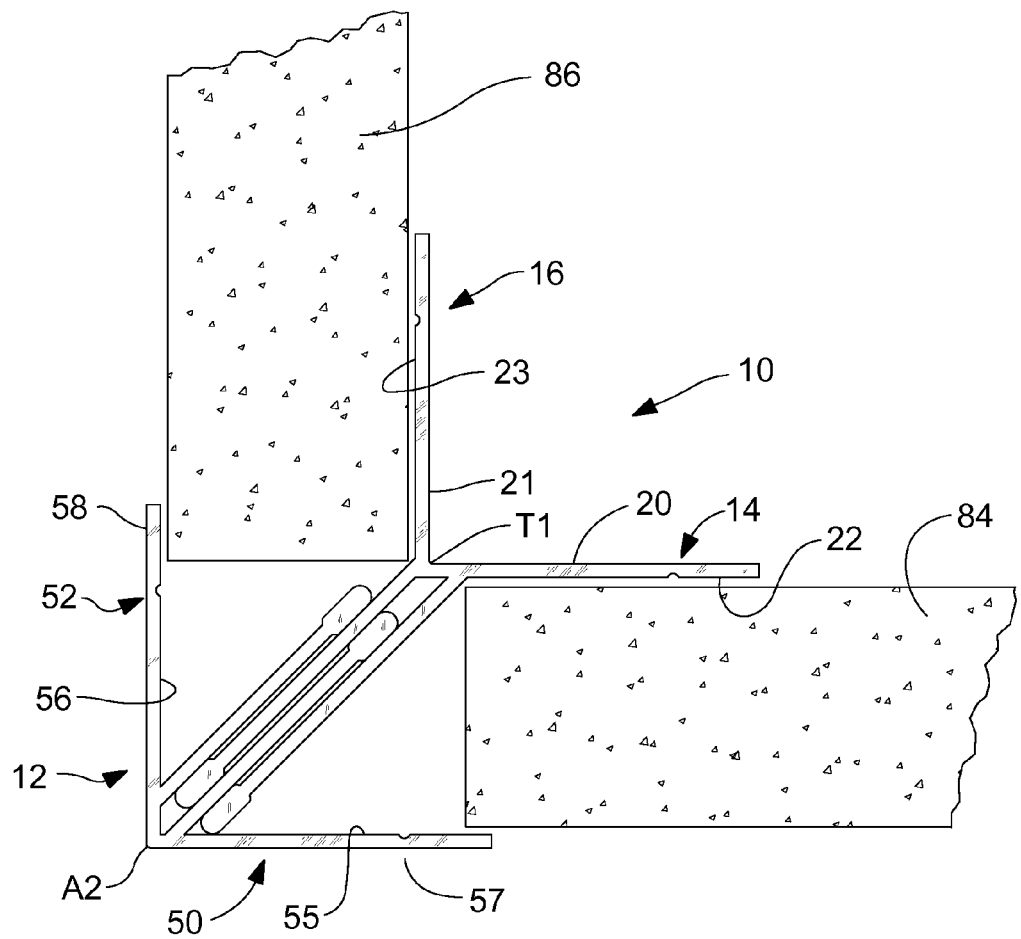
FIG. 4 shows an end view of the assembled device in FIG. 3 with the connector strips in a minimum panel space condition and with panels captured between the connector strips.

Referring now to the configuration in FIG. 4, panels 84 and 86 are shown captured by the engaged connected strips 10 and 12 of FIG. 3. The panel 84 is captured between the outside surface 22 of the leg 14 on the outside connector strip 10 and the inside surface 55 of the leg 50 on the inside connector strip 12. These surfaces 22, 55, and thus the legs 14, 50, at least partly confront or overlie one another to capture both sides of the panel. Similarly, the panel 86 is captured between the outside surface 23 of the leg 16 on the outside connector strip 10 and the inside surface 56 of the leg 52 on the inside connector strip 12. These surfaces 23, 56, and thus the legs 16, 52, at least partly confront or overlie one another to capture both sides of the panel 86.

The spacing between the confronting surfaces 22, 55 and 23, 56 can be adjusted between the maximum and minimum panel thickness positions as noted above so as to adjust to the panel thickness and to snugly capture the panels, if desired. The term panel is used herein for planar ceiling tiles and wall and ceiling panels, such as the panels 84 and 86. However, it is certainly within the spirit and scope of the present invention that the connector devices support other objects that have a perimeter edge capable of being captured and supported by the strips 10 and 12. Such objects can include artwork, posters, decorative panels, surface relief tiles, or other three-dimensional objects. The term "panel" as used herein is intended to encompass such other objects and the connector device is intended to be capable of supporting such other objects or "panel-like loads."

As will be evident to those having ordinary skill in the art, the dimensions for the various parts of the connector device can vary and yet fall within the spirit and scope of the present invention. The material thickness of the legs and flanges can be varied to alter the load supporting capability of the connector device and the force necessary to connect and disconnect the two strips 10 and 12 of the device. Width of the flanges and legs can also be varied for the same purpose. Also, the various dimensions can be altered to accommodate different thickness panels or tiles. Additionally, the dimensions can be designed so that a specific connector device can have a desired range between the minimum and maximum panel thickness position to accommodate a desired range of panel thicknesses. As used herein, the term length is used to represent the lengthwise dimension along the longitudinal axis of the devices. The length of the strips or components and thus the various parts of these strips can vary considerably. The other dimensions of the strips can be altered to significantly change the functional characteristics of the disclosed devices.

In one example, each head 34, 36, 74, 76 can have a material thickness of approximately 0.095 inches. In one example, each connector flange 26, 28 of the strip 10 can have a width, measured from about the middle of the seam 18 to the head tips 80, of approximately 1.75 inches. In one example, each connector flange 60 and 62 of the strip 12 can also have a width, measured from about the middle of the seam 54 to the head tips 80, of approximately 1.768 inches. In one example, each bead or head 34, 36, 74, 76 can have a width from the tip 80 to the end of each ramp 82 of approximately 0.211 inches. In one example, each stem section 30, 32, 70, 72 of the connector flanges 26, 28, 60, 62 can have a material thickness of approximately 0.07 inches. Each of the legs 14, 16, 50, 52 of each channel has an outer edge 90, 92, 94, 96, respectively. In one example, each leg 14, 16, 50, 52 can have a width from the respective apex A1 or A2 to the corresponding outer edge 90, 92, 94, 96 of approximately 2.0 inches. In one example, each leg 14, 16, 50, 52 can also have a material thickness of approximately 0.08 inches. The gap dimensions G1 and G2 in one example can be approximately 0.030 inches. The spacing dimensions S1 and S2 in one example can be approximately 0.095 inches, which matches the thickness of the heads. When the spacing dimensions S1 and S2 matches the thickness of the heads 34, 36, 74, 76, the heads 34, 36, 74, 76 fit snugly between the stem sections 30, 32, 70, 72 of the flanges 26, 28, 60, 62. By fitting snugly, the connection between the two connector strips 10, 12 is frictionally maintained at the ideal dimension to support a panel of a given thickness that is between a maximum panel thickness and a minimum panel thickness.

Figure 5:
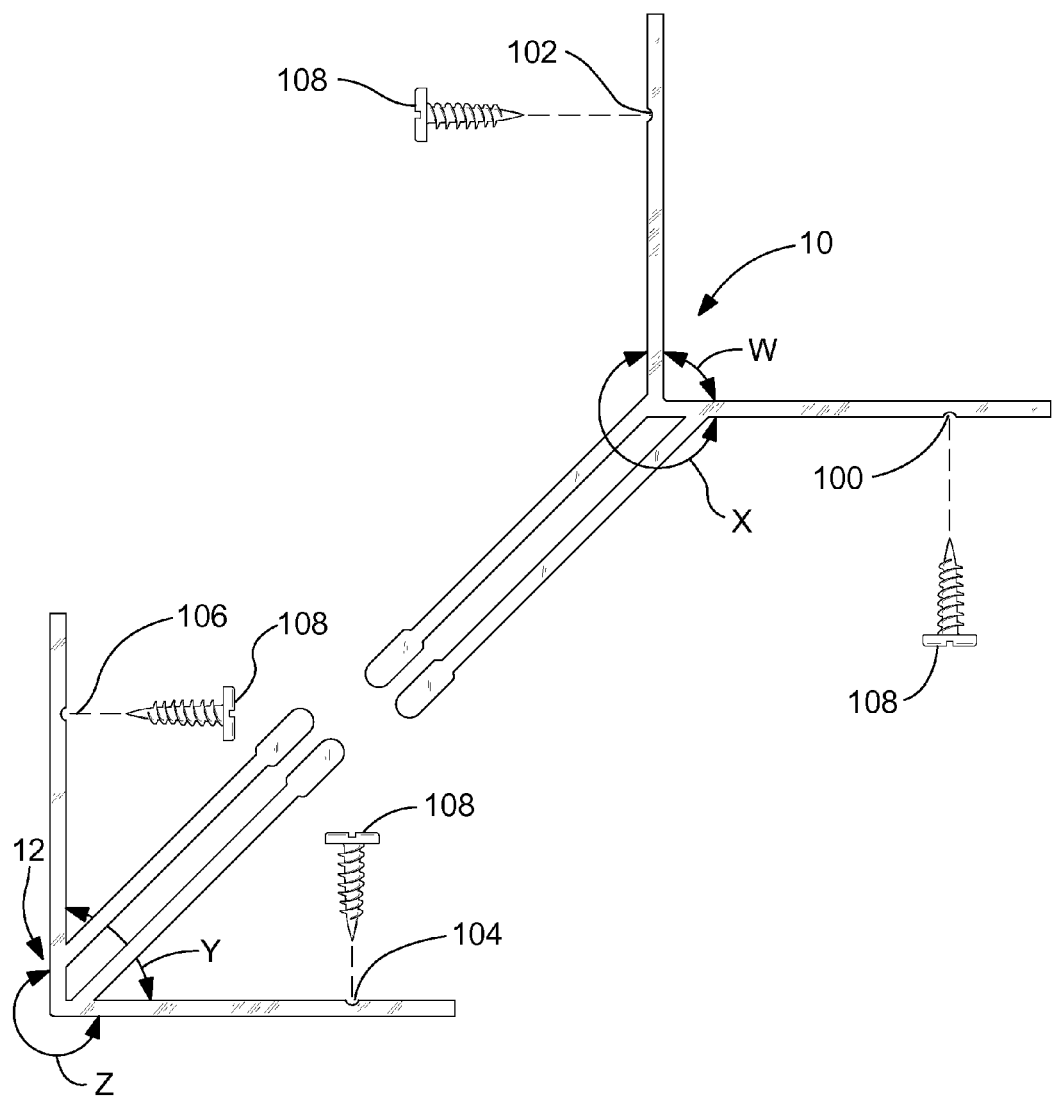
FIG. 5 shows an end view of the disconnected strips in FIG. 2 and fasteners for optionally mounting either one or the other of the strips to a corner.

Each connector strip also has continuous fastener grooves to assist in installation of the connector device. As shown in FIGS. 1-3 and 5, the outside connector strip 10 has fastener grooves 100, 102 formed lengthwise along the outside surfaces 22, 23 on the first and second legs 14, 16, respectively. Similarly, the inside connector strip 12 has fastener grooves 104, 106 formed lengthwise along the inside surfaces 55, 56 on the third and fourth legs 50, 52, respectively. As represented in FIG. 5, conventional screws 108 or other fasteners can be aligned with one of the grooves anywhere along the length of the connector device. The grooves will help assist one in properly positioning and in holding the fastener in position during installation.

Because the grooves are continuous in this example, an installer can install the connector device using any number of fasteners desired and at virtually any location along the length of the device, as needed. This can allow the device to support a relatively heavy panel load if needed and can minimize product waste caused by trimming during installation. An installer can place screws 108 at intervals along the longitudinal length of the grooves 100, 102, 104, 106, as necessary. For example, structural elements such as wall studs, furring strips, and floor or ceiling joists are very often found at regular 16 inch center-to-center intervals. However, typical center intervals can range from less than 16 inches to 24 inches and more. The disclosed connector devices can accommodate virtually any installation application.

In addition, virtually any type of fastener can be utilized to install the disclosed connector devices. In one example, the screws 108 can be a drywall, self-tapping fastener, which are well known and available at nearly any building materials outlet or hardware store. Drywall screws have been shown to penetrate plastic materials such as polyvinylchloride (PVC) without cracking the plastic. The disclosed connector strips can also be fabricated from a variety of materials and processes, as long as the connector flanges have some resiliency and flexibility for connection and disconnection and the device is capable of adequately supporting loads, as desired. In one example, the connector strips 10 and 12 can be formed having a fire retardant characteristic, even if formed from a plastic material, which can yield an important marketing advantage.

In one example, the strips or components 10 and 12 can be continuously extruded from PVC or other suitable plastic materials. The devices can be trimmed upon extrusion to desired lengths for commercial sale and shipping and then further trimmed by an installer on the job as needed. In other examples, the connector strips 10 and 12 can be formed of wood, metal, paper, paperboard, cardboard, rubber, and the like. Fibrous composites such as Kevlar or fiberglass are also perhaps suitable. However, PVC can be economically extruded into the disclosed shapes by plastics fabricators that are skilled in the art of plastic extrusions. A continuous and appropriately sized and shaped connector strip can then be trimmed to standard or custom lengths.

Figure 6:
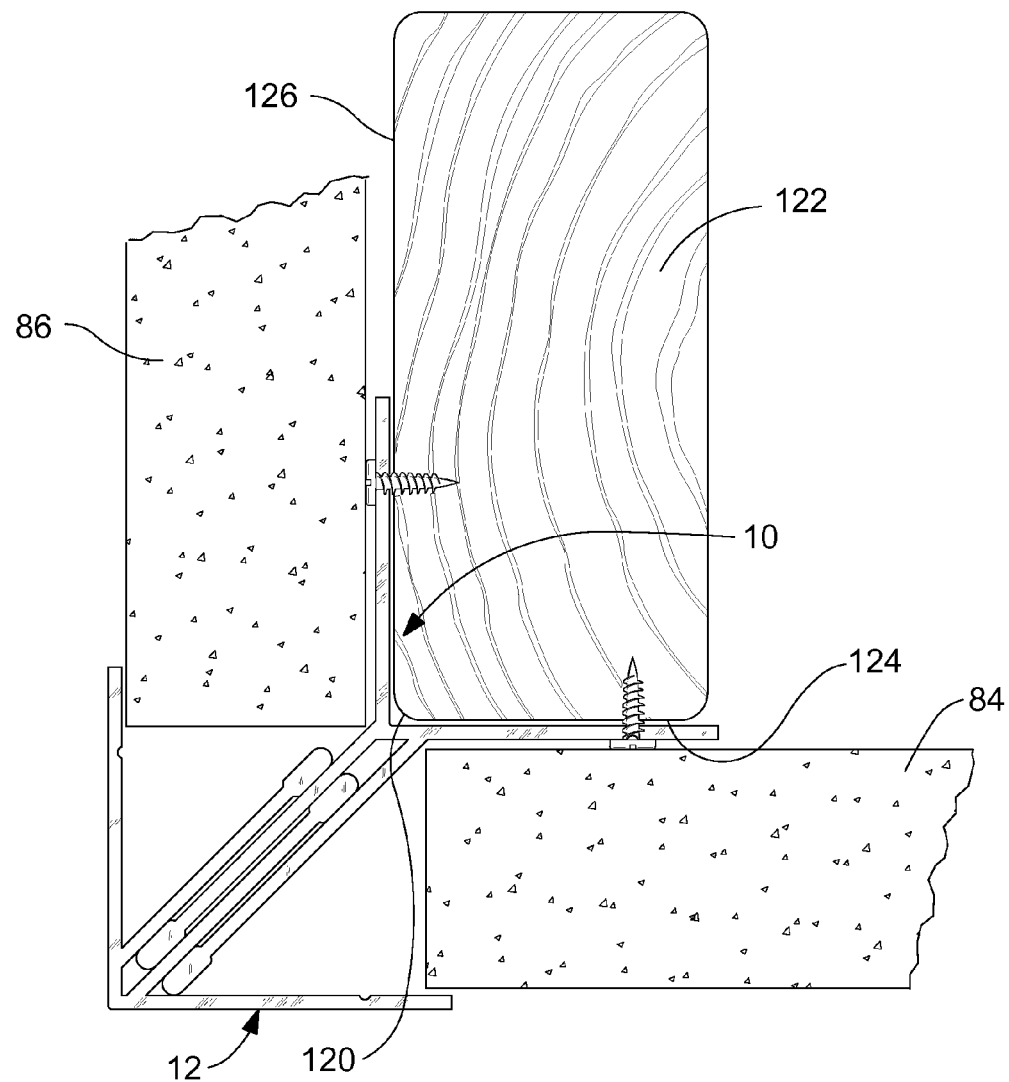
FIG. 6 shows a cross section view of the assembled device in FIG. 5 and mounted to an outside or exterior corner.

In one example illustrated in FIG. 6, the connector device as depicted in FIG. 4 can be mounted to create an outside corner joint between adjacent panels 84 and 86. In this example, the trimmed strip 10 is placed with the trough T1 facing an exposed outer corner 120 of a structural object 122, such as a stud in this example. The strip's inside surface 20 of the leg 14 abuts a surface 124 of the stud 122 and the inside surface 21 of the leg 16 abuts a surface 126 of the stud. Fasteners 108 are shown installed through the grooves 100 and 102 to secure the trimmed strip in place on the stud 122 (See FIG. 5). The panels 84 and 86 can then be positioned against the respective exposed outside leg surfaces 22 and 23. The inside connector strip 12 can then be connected to the strip 10 as discussed above to capture the panels in place. The outside corner arrangement in FIG. 6 can represent either a vertical wall corner or a horizontal ceiling structure corner.

Figure 7:
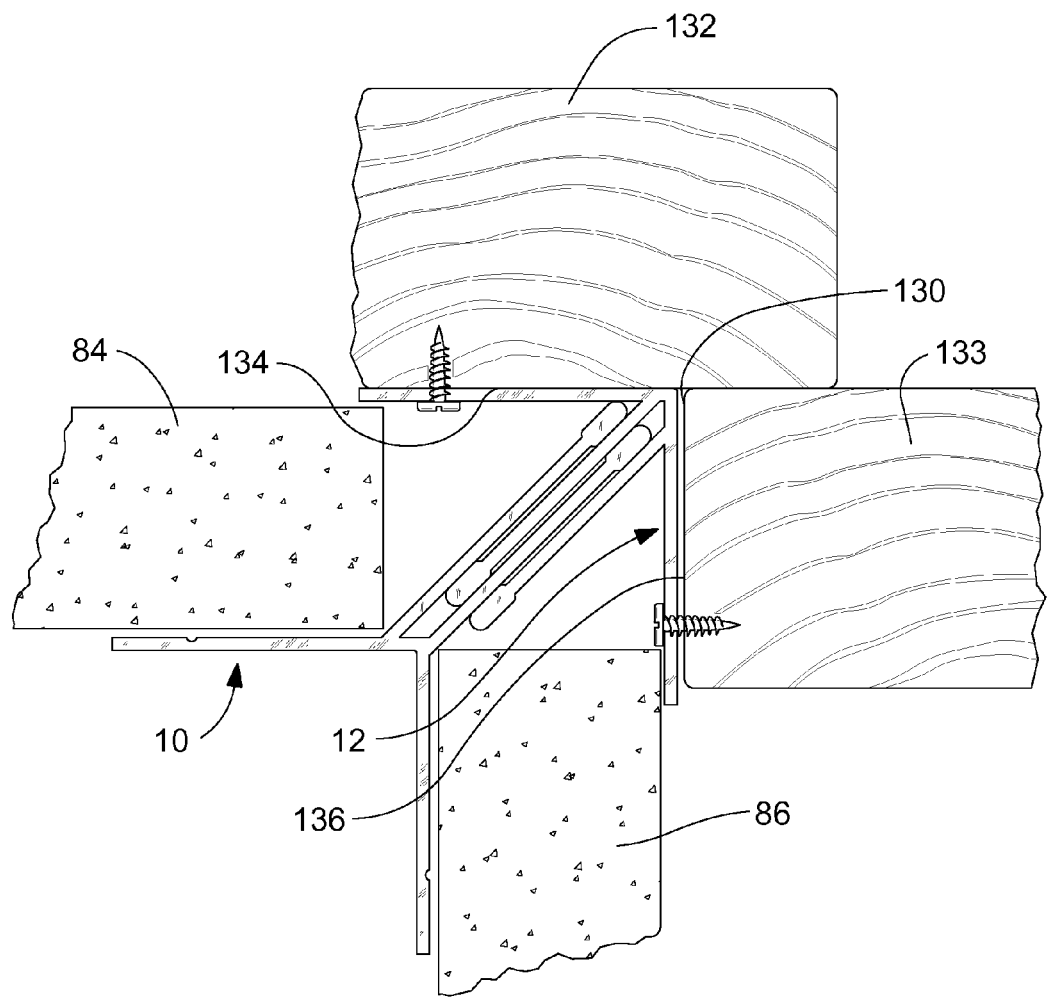
FIG. 7 shows a cross section view of the assembled device in FIG. 5 and mounted to an inside or interior corner.
Figure 8:
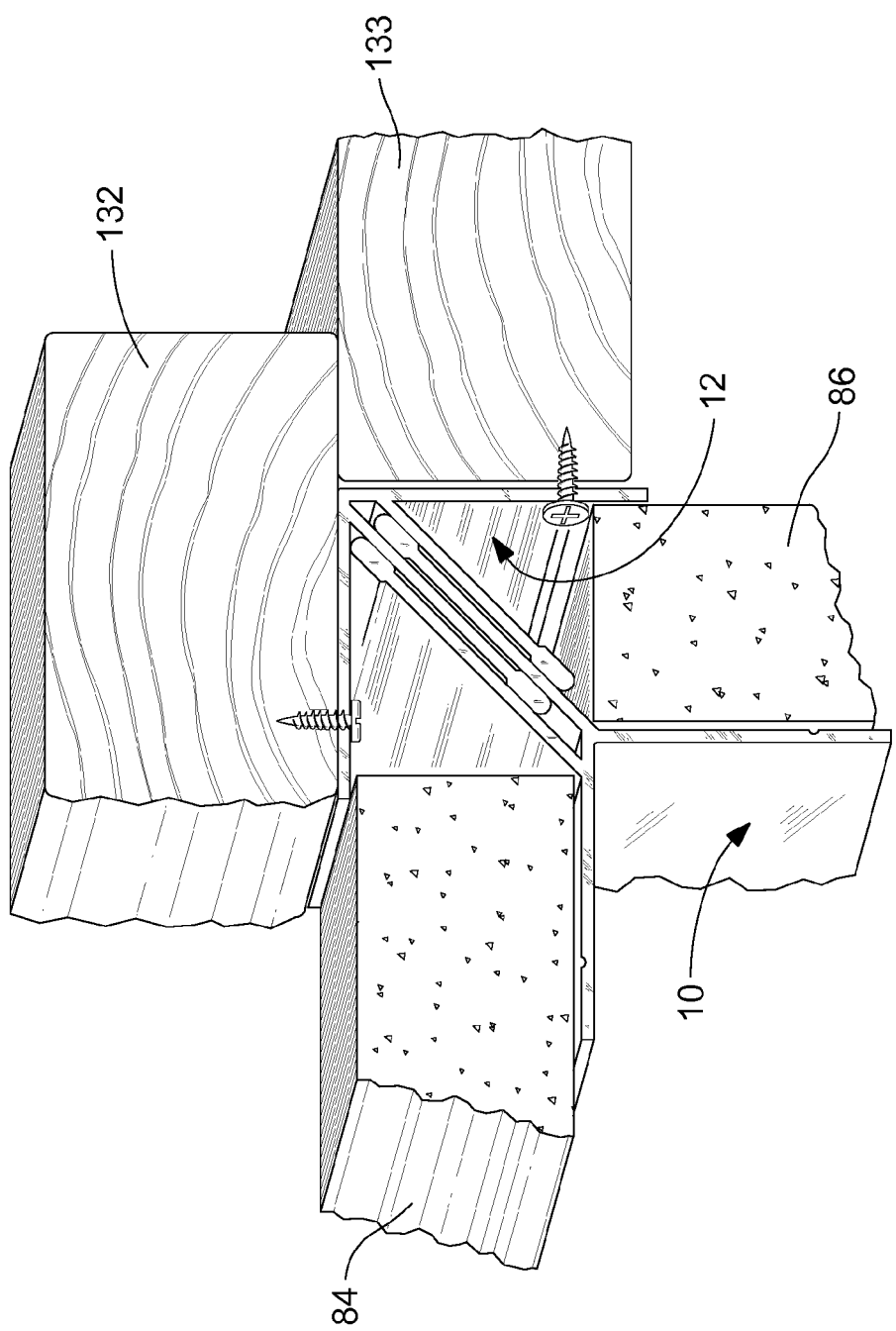
FIG. 8 shows a perspective view of the installed device in FIG. 7.

In another example illustrated in FIGS. 7 and 8, the connector device as depicted in FIG. 4 is also be mounted to create an inside corner joint between adjacent panels 84 and 86. In this example, the component 12 is placed with the apex A2 facing an exposed inner corner 130 of a structural object, such as adjoining studs 132, 133 in this example. The strip's outside surface 57 of the leg 50 abuts a surface 134 of the stud 132 and the outside surface 58 of the leg 52 abuts a surface 136 of the stud 133. Fasteners 108 are shown installed through the grooves 104 and 106 to secure the trimmed strip 12 in place on the studs 132, 133 (See FIG. 5). The panels 84 and 86 can then be positioned against the respective exposed inside leg surfaces 55, 56. The outside connector strip 10 can then be connected to the strip 12 as discussed above to capture the panels in place. The inside corner arrangement in FIG. 7 can also represent either a vertical wall corner, a wall to ceiling corner joint, or a horizontal ceiling structure corner.

Figure 9:
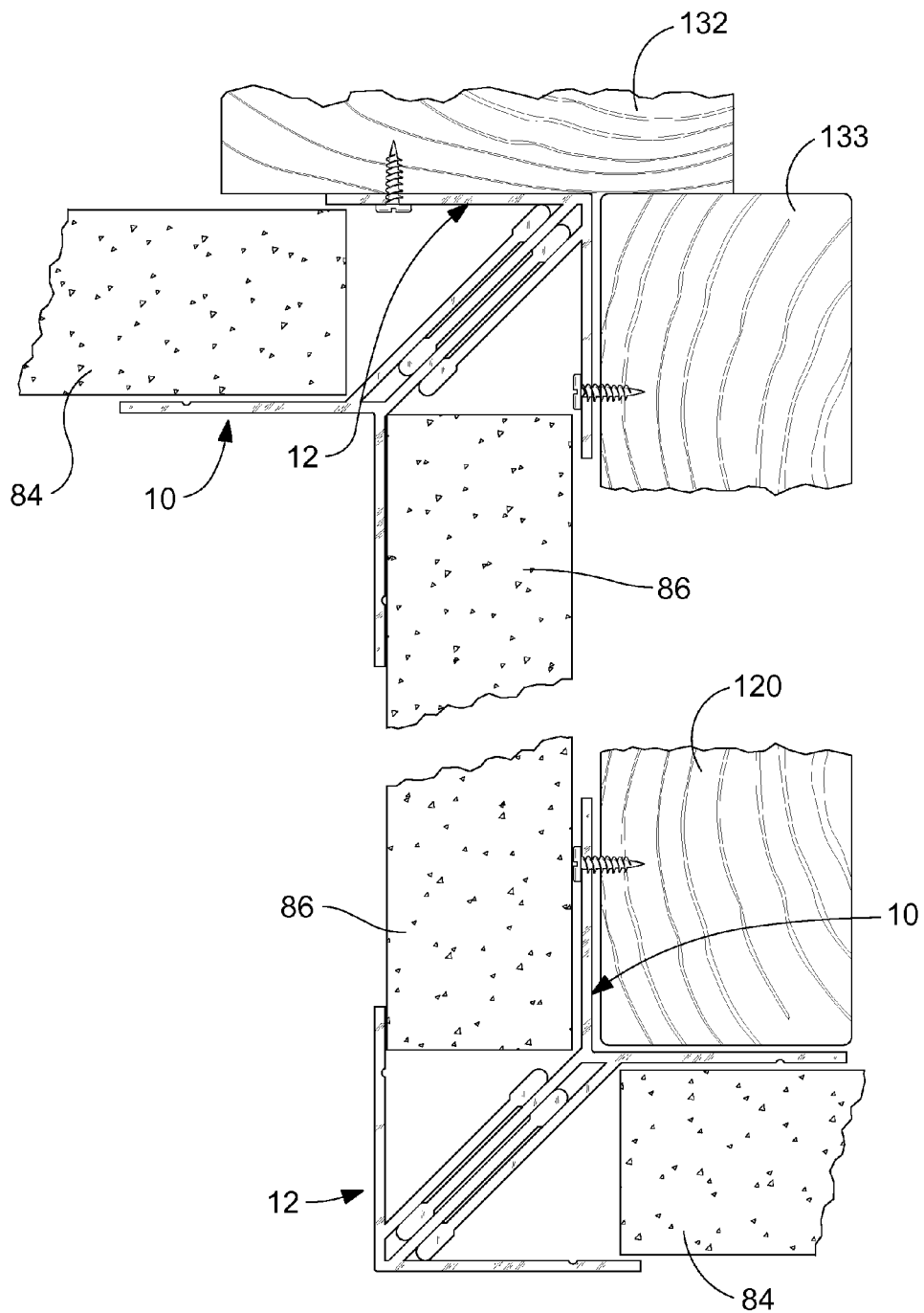
FIG. 9 shows a fragmentary end view of a combination of the devices in FIGS. 6 and 7 mounted to circumvent an exterior or outside corner and an adjacent interior or inside corner.
Figure 10:
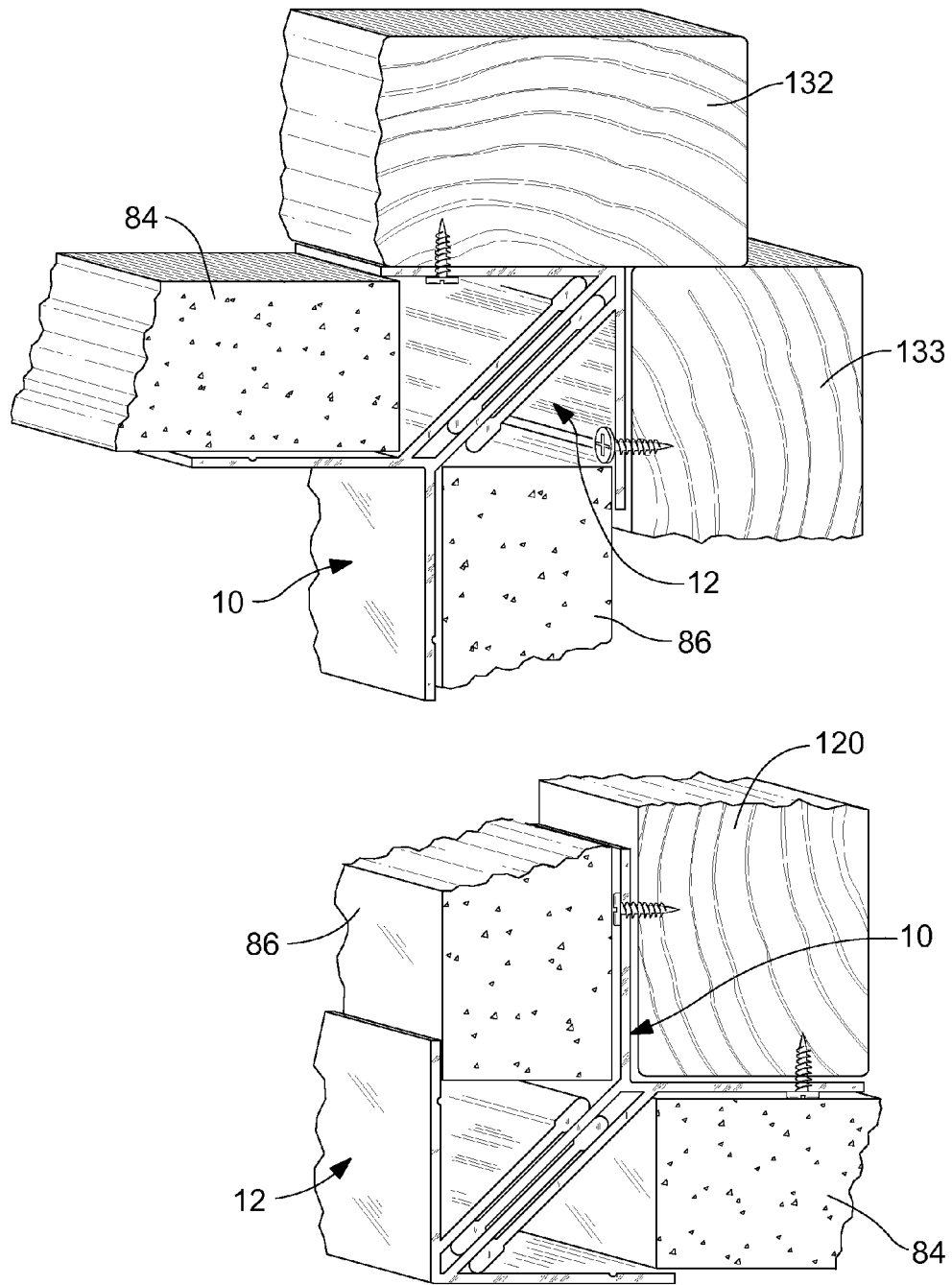
FIG. 10 shows a perspective view of the device and panel arrangement in FIG. 9.
Figure 11:
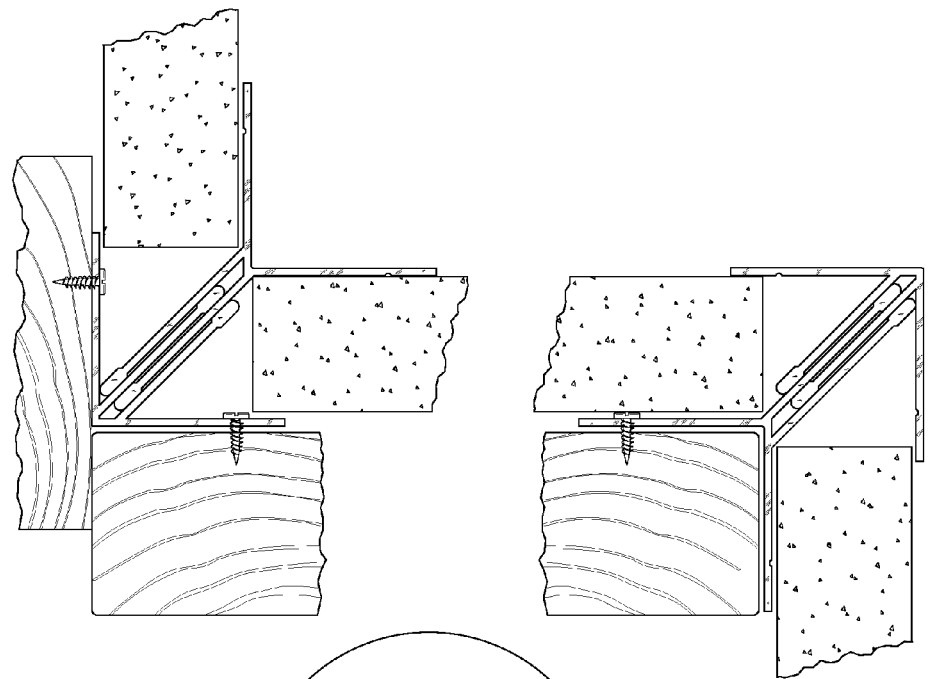
FIG. 11 shows a cross section of multiple assembled devices in FIGS. 6 and 7 configured to accommodate an obstruction displaced from a flat wall or ceiling.
Figure 11:
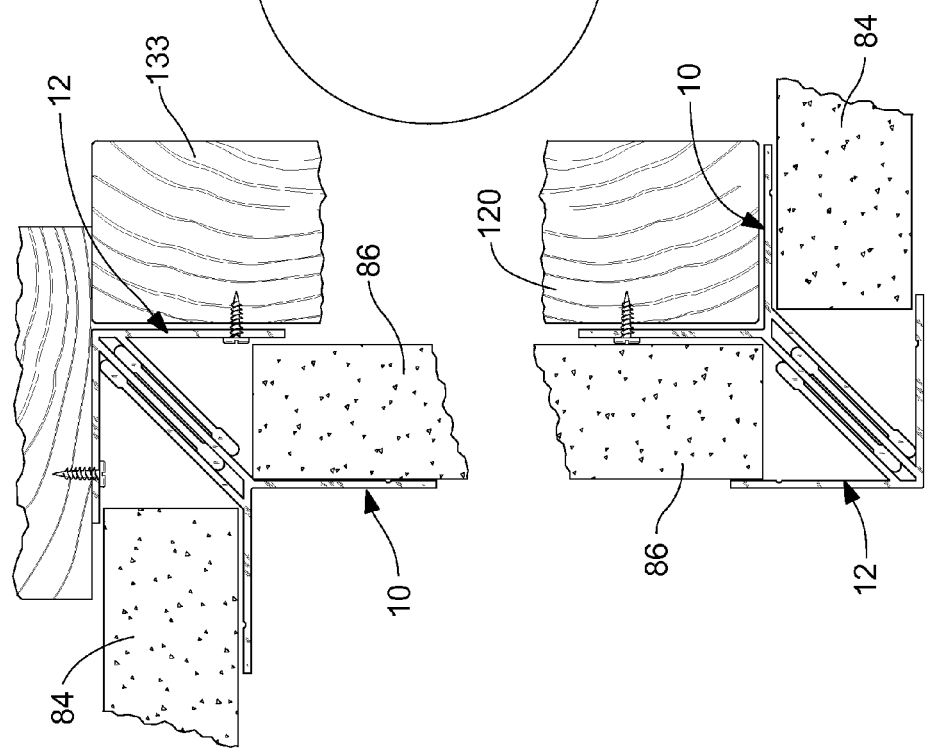

In another example, FIGS. 9 and 10 illustrate a combination of the arrangements in FIGS. 6-8. This arrangement can be employed in a horizontal orientation to enclose a kitchen or other type of soffit or to enclose one side of a ceiling obstruction such as an exposed water or steam pipe or a beam. The opposite side of such an obstruction can be configured as a mirror image arrangement of the connector devices and panels as seen in FIG. 11. These arrangements can also be employed in a vertical orientation to enclose wall obstructions such as an exposed water pipe or air duct. These embodiments could be used in varying combinations to conform to the corners formed by other structural arrangements as well. In one example, four of the outside arrangements shown in FIG. 6 can be employed to fully enclose a completely exposed heating duct or all sides of a support column in a basement or attic environment. The disclosed devices can be employed in the various configurations to create a pleasing appearance within an office, recreational, or industrial area to hide structural features.

Figure 12:
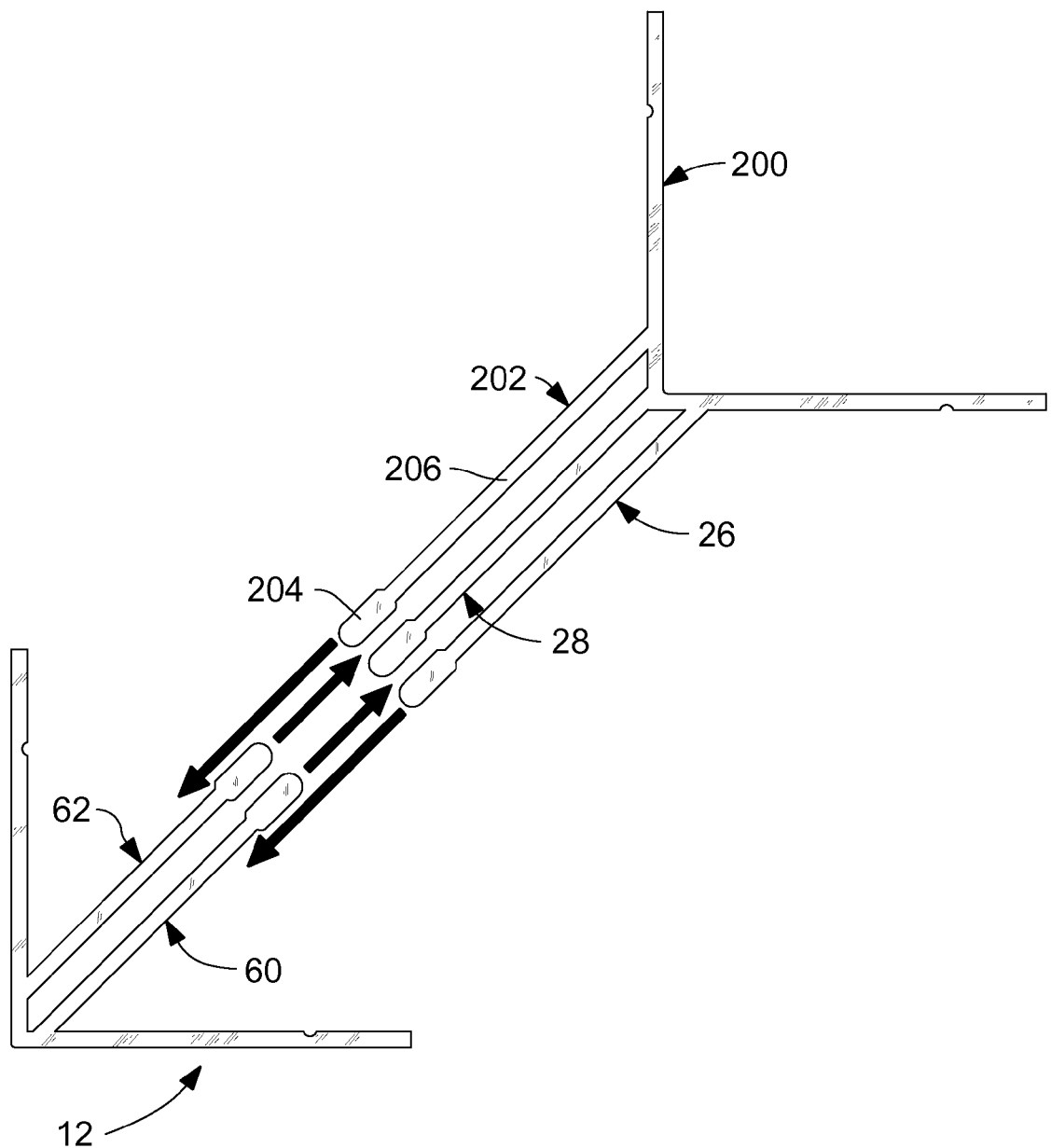
FIG. 12 shows an end view of an alternative example of a corner connector device according to the teachings of the present invention.

An alternative example of a connector device is shown in FIG. 12. In this example, the inside connector strip 12 is identical to that described previously with respect to FIGS. 1-11. The outside connector strip 200 shown in FIG. 12 is also nearly identical to the described above outside strip 10. However, in this example, the strip 200 includes a fifth connector flange 202 that has a head or bead 204 and a stem section 206. In this example, the flanges 60 and 62 of the inside connector strip each seat between a pair of the connector flanges 26, 28, 200 when the strips 200 and 12 are connected in a manner as described above.

Figure 13:
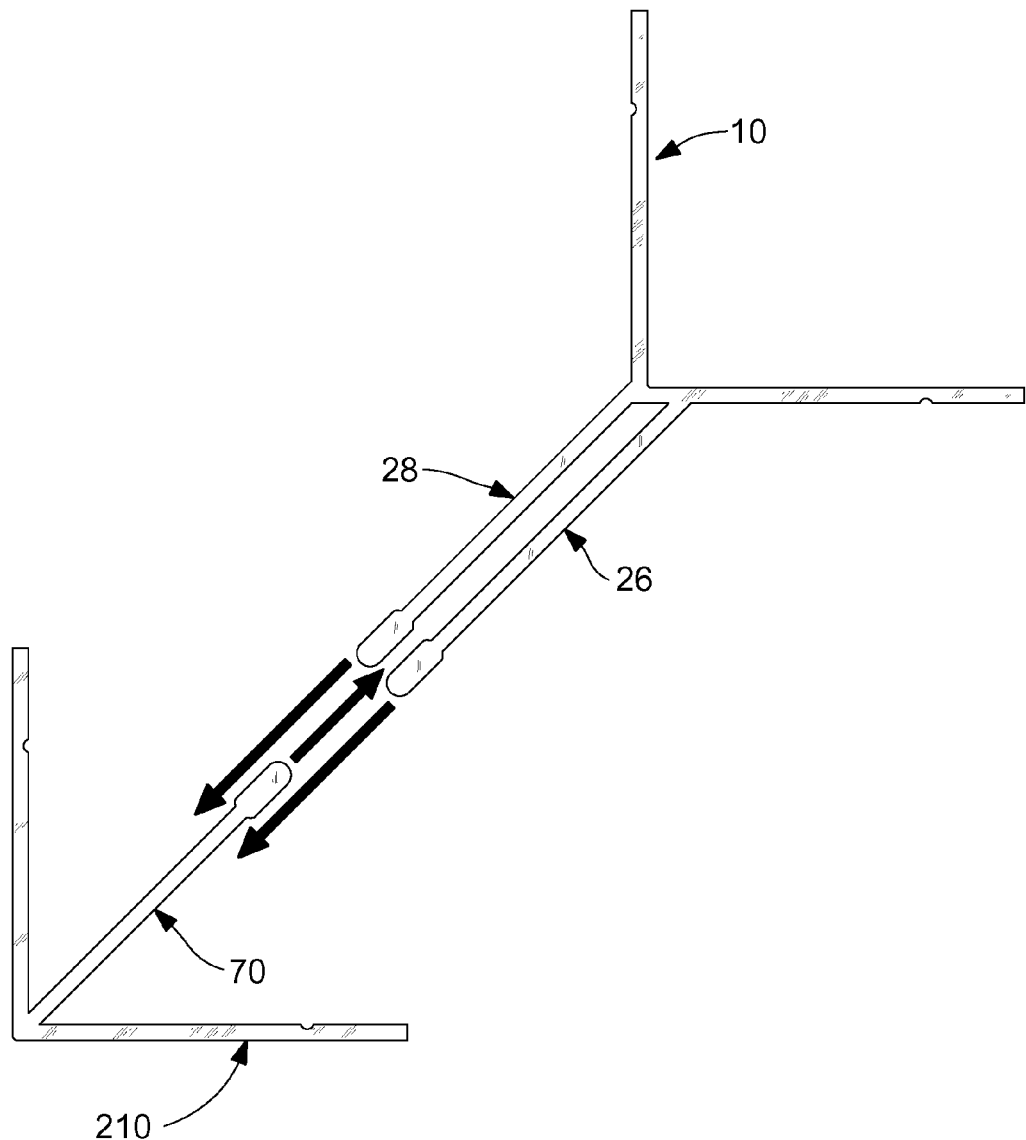
FIG. 13 shows an end view of another alternative example of a corner connector device according to the teachings of the present invention.

FIG. 13 shows yet another alternative example of a connector device. In this example, the outside connector strip 10 is identical to that described previously with respect to FIGS. 1-11. In this example, the inside connector strip 210 has only the third connector flange 70. The fourth connector flange 72 has been eliminated. In this example, the single flange 70 seats between the pair of flanges 26 and 28 when the strips 10 and 210 are connected in a manner as described above.

The illustrated example in FIGS. 1-11 shows a pair of the connector flanges on each strip 10 and 12. By having two flange pairs, each strip has one flange captured between the pair on the other strip and one flange resiliently pressing against an outside of one of the flanges of the other pair. This mutual engaged flange arrangement can assist in maintain a consistent force applied by each pair of flanges when the device is installed and the strips are connected. This also can significantly increase the force applied by the flanges both to resist disconnection and during connection while permitting the material thickness of any one flange, head, or the like to be relatively minimal. However, as depicted in FIGS. 12 and 13, other flange arrangements are certainly possible. Either one of the components 10 or 12 can have only a single flange, while the other has a pair of flanges. Either one of the components 10 or 12 can have three or more flanges while the other component can have only two or more.

The disclosed corner connector components 10, 12 can be provided in a kit including a plurality of each of the two components. Only the two connector components 10, 12 are needed and can be selectively arranged to form paneled inside corners and paneled outside corners as described above. The two components 10, 12 can be used to support panels 84, 86 on virtually any obstructed surface in a room, such as wall corners, ceiling to wall corners, soffits, and the like.

The disclosed kit can be used to panel both the inside corners and outside corners. For example as illustrated in FIG. 6, a paneled outside corner joint is formed using the corner connector components 10, 12 according to the following steps. First, the user will select one of the first components 10 from the kit. The user will then measure the length of the corner to be paneled. The user may then need to trim or cut the selected first component 10 to the measured length. Each component 10, 12 can be cut using a typical utility knife, shears, or the like. Any rough edges left after cutting may be further trimmed off or smoothed using a fine grit sandpaper.

The user can then place the trimmed first component 10 over the substrate 122 of the outside corner joint with the first connector 26, 28 extending outwardly. The user can then fasten, secure, or otherwise mount the first component 10 to the substrate 122 with screws 108 driven through the fastener grooves 100, 102 and into the substrate. Typically, screws can be used to mount the connector components to the substrate. However, the components can also be mounted using nails, brads, industrial staples, adhesive, adhesive tape, or the like. The fastener grooves 100, 102 on each leg 14, 16 of the component 10 face outwardly when the component is placed against the substrate. Screws 108 can be placed at 6 inch intervals similar to an interval used for installation of drywall. Other intervals may also be used, such as to accommodate a specific weight of the panels 84, 86 to be supported. The first screw 108 may be placed 3 to 4 inches from either a ceiling or a floor if the corner is a vertical corner or an edge of a surface if the corner is a horizontal corner. The screws 108 are inserted through each of the fastener grooves 100, 102. The screws may be staggered or offset from one another along the legs 14, 16 of the connector 10.

Two panels 84, 86 can be placed on the substrate surfaces, each with an edge against and adjacent one of the legs 14, 16 of the mounted component 10 on each side of the seam. This step may require the installer to have an assistant. The user can then select and, if needed, trim or cut one of the second connector components 12 to the desired length (likely the same length as the cut first component 10). The selecting and cutting step can alternatively be done when the first component 10 was selected to be trimmed. The user can then connect the second component 12 to the first component 10. This is done by aligning the second connectors 60, 62 of the second component 12 with the exposed first connectors 26, 28 of the first component 10. A user can then push the components 10 and 12, and thus the connectors 26, 28 and 60, 62, together beginning at one end. The user continues to push the connectors together like a zipper from one end of the components to the other end until the entire lengths of the corner connectors are engaged. The two panels 84, 86 should now be captured between the legs 14, 16 and 50, 52 of the components. The gap between the legs 14, 16 and 50, 52 of the connected components 10, 12 can accommodate a variety of panel thicknesses by pushing firmly on the second connector 12 over its entire length until the legs contact the panel edges.

Similar to the method of forming an outside corner, another example as illustrated in FIG. 7, a paneled inside corner joint is formed using the corner components 10, 12 according to the following steps. First, the user will select one of the second components 12 from the same kit. The user will then measure the length of the inside corner to be paneled. The user may then trim or cut the selected second component 12 to the measured length.

The user can then place the trimmed second component 12 against the substrate 122 and into the inside corner. The user can then fasten, secure, or otherwise mount the second component 12 to the substrate 122 with screws 108 driven through the fastener grooves 104, 106 and into the substrate. The fastener grooves 104, 106 on each leg 50, 52 of the corner connector component 12 face outwardly when the component is placed against the substrate. Screws 108 can be placed at intervals and staggered similar to the placement discussed above for an outside corner.

Two panels 84, 86 can be placed on the substrate surfaces, each with an edge against and adjacent one of the legs 50, 52 of the mounted component. Again, this step may require the installer to have an assistant. The user can then select and, if not already done, trim or cut one of the first components 10 to the desired length. The user can then connect the first component 10 to the second component 12. This is done by aligning the first connectors 26, 28 of the first component 10 with the exposed second connectors 60, 62 of the second component 12. A user can then push the components 12 and 10, and thus the projecting connectors 60, 62 and 26, 28, together beginning at one end. Much the same as forming an outside corner, the user continues to push the connectors together from one end of the components to the other end until the entire lengths of the corner connectors are engaged. The two panels 84, 86 will then be captured between the legs 14, 16 and 50, 52 of the components.

The corner connector components disclosed and described herein, when installed, can provide easy access to any objects covered by the panels. For example, plumbing or electrical utilities covered by the panels may be accessed by removing any one or more of the outer components and the panels, as needed. The components can be easily separated in one step and with no tools needed. The user can simply grasped one end and pull on the outer, exposed component 10 or 12 to separate the projecting connectors over the length.

Mounted connectors 10, 12 can also be easily removed and reused. In order to do so, one would remove the outer, exposed component 10, 12 as above, and then remove the supported panels 84, 86. The user can then remove the exposed screws 108 attaching the mounted component to the supporting substrate. The corner component kit may then be reused to optionally create another outside corner or inside corner. As noted above, the orientation of the components can be reversed to form either an inside corner or an outside corner configuration.

As only the same two components 10, 12 are needed to form either inside or outside corners, any manner of paneling corner configurations may be accomplished with the above outlined steps and requiring only the two connector components. For example, a soffit is basically a box formed around an obstruction that a user wishes to cover, such as existing ductwork, piping, or beams. Often, a soffit will be desired in basements where ductwork, plumbing, gas lines and valves, and electrical systems are exposed. Because the desired panels may easily be mounted and moved, the disclosed corner components and kit are ideal for such use. In order to form a soffit, a framework for the soffit must first be installed to provide the mounting substrate. The framework is usually made from lengths of 2×3 or 2×4 lumber. The pieces of lumber are cut to length, connected together to form a U- or L-shaped assembly, and then braced lengthwise forming a substrate cage or framework around the objects to be covered. A soffit usually produces multiple inside and outside corners.

The soffit can then be covered with panels using the above steps. The manner of installing the corner connector components is essentially the same for inside corners and outside corners. In each case, inside corners and outside corners still only require the same two components, differing only in whether a first component 10 or a second component 12 is first mounted to the substrate.

An important consideration in all embodiments is the degree of flexibility required to maintain the engagement of the extending flanges in their respective cavities. For example, metal and plastic corner connectors are well suited for ceiling or wall panel applications. As to manufacturing requirements, a preferred standard length of each corner connector would be approximately eight feet per unit.

Load capacity depends upon the relationship between the flexibility of the material and the resistance to engagement (and disengagement) created by the number of connector flanges and/or the difference in thickness between stem sections and the heads. In other examples, the connector flanges could also be replaced by other types of mechanisms for the inside and outside connectors that permit connection and disconnection of the two strips. The load capacity could be altered depending on the connection mechanism utilized.

In general, the more flexible the material, the less the load which can be supported. However a greater difference in thickness between the stems and paddle-shaped upper ends can compensate for a more flexible material. If the paddle-shaped ends are relatively thicker than the stems 10, then the resistance to engagement or disengagement will be greater.

Although certain corner connector devices, systems, and methods have been described herein in accordance with the teachings of the present disclosure, the scope of coverage of this patent is not limited thereto. On the contrary, this patent covers all embodiments of the teachings of the disclosure that fairly fall within the scope of permissible equivalents. It will be apparent to those of ordinary skill in the art that changes, additions and/or deletions may be made to the disclosed examples without departing from the spirit and scope of the invention. The foregoing description is given for clearness of understanding only, and no unnecessary limitations should be understood therefrom. Modifications within the scope of the invention may be apparent to those having ordinary skill in the art.

What is claimed is:

1. A method of forming paneled corners, the method comprising the steps of:
   providing a plurality of first components and a plurality of second components,
      each of the plurality of first components having a pair of first legs oriented relative to one another at an angle forming an exterior angle of greater than 180 degrees and joined along a lengthwise seam, and each of the plurality of first components having a first connector protruding from adjacent the lengthwise seam and on the exterior side of each of the plurality of first components and equally dividing the exterior angle,
      each of the plurality of second components having a pair of second legs oriented relative to one another at the same angle and forming an interior angle of less than 180 degrees and joined along a lengthwise seam, and each of the plurality of second components having a second connector protruding from adjacent the lengthwise seam and on the interior side of each of the plurality of second components and equally dividing the interior angle;
   choosing a structure having both an outside corner and an inside corner to receive a plurality of panels;
   choosing the outside corner of the structure;
   selecting one of the plurality of first components;
   placing the one of the plurality of first components over the outside corner;
   securing the one of the plurality of first components to the outside corner;
   placing two panels adjacent the structure with a panel edge of each panel on a respective one of the first legs;
   selecting one of the plurality of second components;
   pushing the one of the plurality of second components onto the selected one of the plurality of first components to engage their respective second and first connectors, thereby capturing the respective panel edges of the two panels between the corresponding first and second legs;
   choosing the inside corner of the structure;
   selecting another of the plurality of second components;
   placing the another of the plurality of second components over the inside corner;
   securing the another of the plurality of second components to the inside corner;
   placing two panels adjacent the structure with a panel edge of each on a respective one of the second legs;
   selecting another of the plurality of first components having a first connector;
   pushing the another of the plurality of first components onto the selected another of the plurality of second components to engage their respective first and second connectors, thereby capturing the respective panel edges of the two panels between the second and first legs.

2. The method according to claim 1, wherein the step of providing further includes providing each of the plurality of first components with a spaced apart pair of first connector flanges as the first connectors, and providing each of the plurality of second components with a second connector flange as the second connectors that can interferingly fit between any pair of the first connector flanges when engaged.

3. The method according to claim 2, wherein the step of providing further includes providing each of the first connector flanges and each of the second connector flanges with a stem section and a head extending along a free edge of the stem section, wherein each head has a thickness that is greater than a thickness of the corresponding stem section, and wherein the spacing between each pair of the stem sections of first connector flanges matches the head thickness of each of the second connector flanges.

4. The method according to claim 3, wherein the step of connecting further includes pushing the head of the second connector flange between a pair of the first connector flanges.

5. The method according to claim 1, wherein the step of securing further includes installing fasteners through a first fastener groove and a second fastener groove along a respective lengthwise surface of each of the first and second legs on the same side as the respective first and second connectors and into a substrate of the structure.

6. The method according to claim 1, further comprising the step of:
selectively removing the one of the plurality of second components from the one of the plurality of first components by pulling the engaged first and second connectors apart from one end to the other of the one of the plurality of first components and the one of the plurality of second components thereby releasing the panels.

7. The method according to claim 1, wherein the step of providing further includes providing the plurality of first components and the plurality of second components as extruded PVC components.

8. A method of forming paneled corners, the method comprising the steps of:
providing a plurality of first components and a plurality of second components, each of the plurality of first components having a pair of first legs oriented relative to one another at an angle forming an exterior angle of greater than 180 degrees and joined along a lengthwise seam, and each of the plurality of first components having a first connector protruding from adjacent the seam along the length and on the exterior side of each of the plurality of first components and equally dividing the exterior angle,
each of the plurality of second components having a pair of second legs oriented relative to one another at the same angle and forming an interior angle of less than 180 degrees and joined along a lengthwise seam, and each of the plurality of second components having a second connector protruding from adjacent the seam along the length and on the interior side of each of the plurality of second components and equally dividing the interior angle;
selecting one of the plurality of first components;
fastening the one of the plurality of first components over an outside corner of the structure;
placing two panels adjacent the structure with a respective panel edge of each over a respective one of the first legs;
selecting one of the plurality of second components;
pushing the one of the plurality of second components onto the one of the plurality of first components to engage their respective second and first connectors, thereby capturing the respective panel edges of the two panels between the first and second legs of the respective one of the plurality of first components and the respective one of the plurality of second components;
selecting another of the plurality of second components;
fastening the another of the plurality of second components over an inside corner of a structure;
placing two panels adjacent the structure with a respective panel edge of each over a respective one of the second legs;
selecting another of the plurality of first components;
pushing the another of the plurality of first components onto the another of the plurality of second components to engage their respective first and second connectors, thereby capturing the respective panel edges of the two panels between the respective second and first legs.

9. The method according to claim 8, wherein the step of providing further includes providing each of the plurality of first components with a spaced apart pair of first connector flanges as the first connectors, and providing each of the plurality of second components with a second connector flange as the second connectors that can interferingly fit between any pair of the first connector flanges when engaged.

10. The method according to claim 9, wherein the step of providing further includes providing each of the first and second connector flanges with a stem section and a head extending along a free edge of the stem section, wherein each head has a thickness that is greater than a thickness of the corresponding stem section, and wherein the spacing between each pair of stem sections of the first connector flanges matches the head thickness of each of the second connector flanges of the second connectors.

11. The method according to claim 8, wherein the steps of fastening further include installing fasteners through a first and second fastener groove along a lengthwise surface of each of the first and second legs on the same side as the respective first and second connectors and into a substrate of the structure.

12. A method of paneling corner structures, the method comprising the steps of:
providing a kit having a plurality of first components and a plurality of second components,
each of the plurality of first components having a pair of first legs oriented relative to one another at an angle forming an exterior angle of greater than 180 degrees and joined along a lengthwise seam, and each of the plurality of first components having a first connector protruding from adjacent the seam along the length and on the exterior side of each of the plurality of first components and equally dividing the exterior angle,
each of the plurality of second components having a pair of second legs oriented relative to one another at the same angle and forming an interior angle of less than 180 degrees and joined along a lengthwise seam, and each of the plurality of second components having a second connector protruding from adjacent the seam along the length and the interior side of each of the plurality of second components and equally dividing the interior angle;
choosing a structure having both an outside corner and an inside corner to receive a plurality of panels;
choosing the outside corner of the structure;
selecting one of the plurality of first components;
securing the one of the plurality of first components over the outside corner of the structure with the respective first connector exposed;
placing two panels of the plurality of panels adjacent the structure with a panel edge of each panel over a respective one of the pair of first legs of the one of the plurality of first components;
engaging the second connector of one of the plurality of second components to the exposed one of the plurality of first connectors capturing the respective edges of the panels therebetween,
choosing the inside corner of the structure;
selecting another of the plurality of second components;
securing the another of the plurality of second components over the inside corner of the structure with the second connector exposed;
placing two of the plurality of panels adjacent the structure with a panel edge of each panel over a respective one of the pair of second legs of the another of the plurality of second components; and
engaging the first connector of another one of the plurality of first components to the exposed second connector capturing the respective edges of the panels therebetween.

13. The method according to claim 12, further comprising the step of:
disconnecting the one of the plurality of second components from the one of the plurality of first components of the outside corner by lengthwise pulling apart the second connector from the first connector, thereby releasing the panels.

14. The method according to claim 13, further comprising the steps of:
removing the one of the plurality of first components from the outside corner;
choosing the inside corner of the structure;
securing the one of the plurality of second components to the inside corner of the structure with the second connector exposed;
placing the respective panel edges over the legs of the one of the plurality of second components; and
engaging the first connector of the one of the plurality of first components to the exposed second connector of the one of the plurality of second components capturing the respective panel edges therebetween.

15. The method according to claim 12, further comprising the step of:
disconnecting the another of the plurality of first components from the another of the plurality of second components of the inside corner by lengthwise pulling apart the first connector from the second connector thereby releasing the panels.

16. The method according to claim 15, further comprising the steps of:
removing the another of the plurality of second components from the outside corner;
choosing the outside corner of the structure;
mounting the another of the plurality of first components to the outside corner of the structure with the first connector exposed;
placing respective panel edges over the legs of the another of the plurality of first components; and
engaging the second connector of the another of the plurality of second components to the exposed first connector of the another of the plurality of first components capturing the respective panel edges therebetween.

17. The method according to claim 12, further comprising the step of:
trimming one or more of the plurality of first components and the plurality of second components to a desired length.

18. The method according to claim 12, wherein the steps of fastening include installing fasteners through a fastener groove extending lengthwise along each of the pair of first and second legs.

* * * * *